United States Patent
Morabito et al.

(10) Patent No.: US 11,921,316 B2
(45) Date of Patent: Mar. 5, 2024

(54) AUTONOMOUS VEHICLE CONSOLE

(71) Applicant: WAYMO LLC, Mountain View, CA (US)

(72) Inventors: Richard Morabito, Grosse Ile, MI (US); Choon Ping Chng, Los Altos, CA (US); Joongmin Yoon, Mountain View, CA (US)

(73) Assignee: Waymo LLC, Moutain View, CA (US)

( * ) Notice: Subject to any disclaimer, the term of this patent is extended or adjusted under 35 U.S.C. 154(b) by 0 days.

(21) Appl. No.: 17/865,540

(22) Filed: Jul. 15, 2022

(65) Prior Publication Data

US 2022/0350069 A1 Nov. 3, 2022

Related U.S. Application Data

(63) Continuation of application No. 16/929,321, filed on Jul. 15, 2020, now Pat. No. 11,460,626.

(Continued)

(51) Int. Cl.
*F21V 8/00* (2006.01)
*B60K 35/00* (2006.01)
(Continued)

(52) U.S. Cl.
CPC .............. *G02B 6/006* (2013.01); *B60R 16/02* (2013.01); *B60W 50/08* (2013.01); *B60W 50/14* (2013.01);
(Continued)

(58) Field of Classification Search
CPC .... G02B 6/006; G02B 6/0051; G02B 6/0055; G02B 6/0061; G02B 6/0068;
(Continued)

(56) References Cited

U.S. PATENT DOCUMENTS 6,539,656 B2   4/2003   Maas et al.
7,705,257 B2   4/2010   Arione et al.
(Continued)

FOREIGN PATENT DOCUMENTS

CN   102431503 A   5/2012
CN   105163974 A   12/2015
(Continued)

OTHER PUBLICATIONS

The First Office Action for Chinese Patent Application No. 202010743258.6, dated Oct. 12, 2023, 21 Pages.

*Primary Examiner* — Arman B Fallahkhair
(74) *Attorney, Agent, or Firm* — Botos Churchill IP Law LLP

(57) ABSTRACT

The technology involves an in-vehicle communication system with a console that is positioned within the cabin of the vehicle, for instance between the front seats so that passengers in the second row can view and access it. The console is configured to provide contextual information to passengers. The console includes a monitor assembly that has a display screen and a notification region. The notification region includes one or more displayable icons and at least one receptacle for a communication device of a passenger. The notification region has a first section comprising an outer cover layer with a first series of masking, diffuser and illuminating layers to selectively illuminate the one or more displayable icons. The notification region has a second section comprising the outer cover layer with a second series of masking, diffuser and illuminating layers to selectively illuminate the at least one receptacle for the communication device.

20 Claims, 25 Drawing Sheets

Related U.S. Application Data

(60) Provisional application No. 62/879,594, filed on Jul. 29, 2019.

(51) Int. Cl.

| | | |
|---|---|---|
| *B60R 16/02* | (2006.01) | |
| *B60W 50/08* | (2020.01) | |
| *B60W 50/14* | (2020.01) | |
| *G05D 1/00* | (2006.01) | |

(52) U.S. Cl.
CPC ......... *G02B 6/0051* (2013.01); *G02B 6/0055* (2013.01); *G02B 6/0061* (2013.01); *G02B 6/0068* (2013.01); *G02B 6/0083* (2013.01); *B60K 35/00* (2013.01); *B60K 2370/152* (2019.05); *B60K 2370/164* (2019.05); *B60K 2370/175* (2019.05); *B60K 2370/176* (2019.05); *B60K 2370/25* (2019.05); *B60K 2370/33* (2019.05); *B60K 2370/34* (2019.05); *B60K 2370/343* (2019.05); *B60K 2370/739* (2019.05); *B60K 2370/774* (2019.05); *B60W 2050/146* (2013.01); *G05D 1/0088* (2013.01)

(58) Field of Classification Search
CPC ......... G02B 6/0083; B60R 1/00; B60R 16/02; B60W 50/08; B60W 50/14; B60W 2050/146; B60K 2370/175; B60K 2370/343; B60K 2370/152; B60K 2370/774; B60K 2370/176; B60K 2370/33; B60K 2370/164; B60K 2370/34; B60K 2370/739; B60K 2370/25; B60K 35/00; G05D 1/0088
See application file for complete search history.

(56) References Cited

U.S. PATENT DOCUMENTS

| | | | |
|---|---|---|---|
| 8,474,860 B2 * | 7/2013 | Ohoka | ............... B60R 21/2165 280/731 |
| 8,666,456 B2 | 3/2014 | Liu et al. | |
| D712,396 S | 9/2014 | Johnson et al. | |
| 8,894,242 B2 | 11/2014 | Tada et al. | |
| D732,521 S | 6/2015 | Chadbourne et al. | |
| D734,314 S | 7/2015 | Swaine et al. | |
| 9,660,395 B2 * | 5/2017 | Yeom | ..................... H01R 13/74 |
| D806,698 S | 1/2018 | Thompson | |
| D827,008 S | 8/2018 | Okada | |
| D829,704 S | 10/2018 | Oross et al. | |
| D829,705 S | 10/2018 | Oross et al. | |
| D836,625 S | 12/2018 | Szeredi et al. | |
| D842,296 S | 3/2019 | Oross et al. | |
| D854,538 S | 7/2019 | Szeredi et al. | |
| D856,410 S | 8/2019 | Lee | |
| D857,791 S | 8/2019 | Luo | |
| 10,406,979 B2 * | 9/2019 | Kim | ........................ G06T 13/80 |
| D864,193 S | 10/2019 | Oosawa et al. | |
| 10,452,257 B2 * | 10/2019 | Kim | ..................... B60W 50/10 |
| 10,483,700 B2 * | 11/2019 | Chen | ..................... H01R 27/00 |
| D872,171 S | 1/2020 | Luo | |
| 10,594,070 B2 * | 3/2020 | Diovardi | ................ B60K 37/04 |
| D881,258 S | 4/2020 | Lindquist | |
| D888,705 S | 6/2020 | Saito | |
| D900,804 S | 11/2020 | Mugica | |
| D900,814 S | 11/2020 | Lee | |
| D902,297 S | 11/2020 | Cathala | |
| D902,918 S | 11/2020 | Friedli | |
| D904,394 S | 12/2020 | Friedli | |
| 10,877,260 B2 | 12/2020 | Kang et al. | |
| D912,655 S | 3/2021 | Ahn | |
| 11,209,683 B1 | 12/2021 | Yoon et al. | |
| 11,360,258 B1 * | 6/2022 | Huwe | ................. G02B 6/0068 |
| 2013/0320177 A1 | 12/2013 | Chen et al. | |
| 2014/0226361 A1 | 8/2014 | Vasylyev | |
| 2016/0149355 A1 * | 5/2016 | Yeom | ................. H01R 13/7175 439/488 |
| 2019/0348791 A1 * | 11/2019 | Diovardi | ................ B60K 37/04 |

FOREIGN PATENT DOCUMENTS

| | | |
|---|---|---|
| CN | 105992990 A | 10/2016 |
| CN | 106994946 A | 8/2017 |
| CN | 108121343 A | 6/2018 |

* cited by examiner

100

150

300

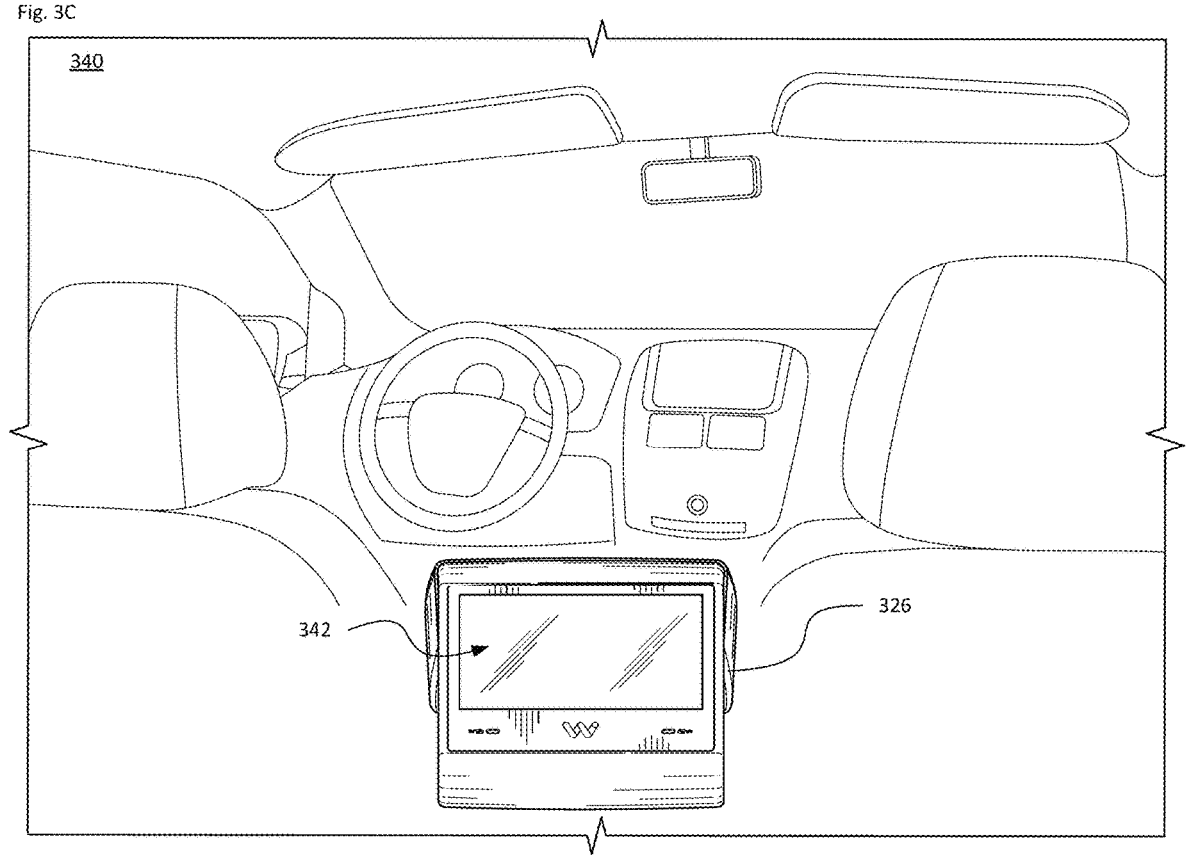

520

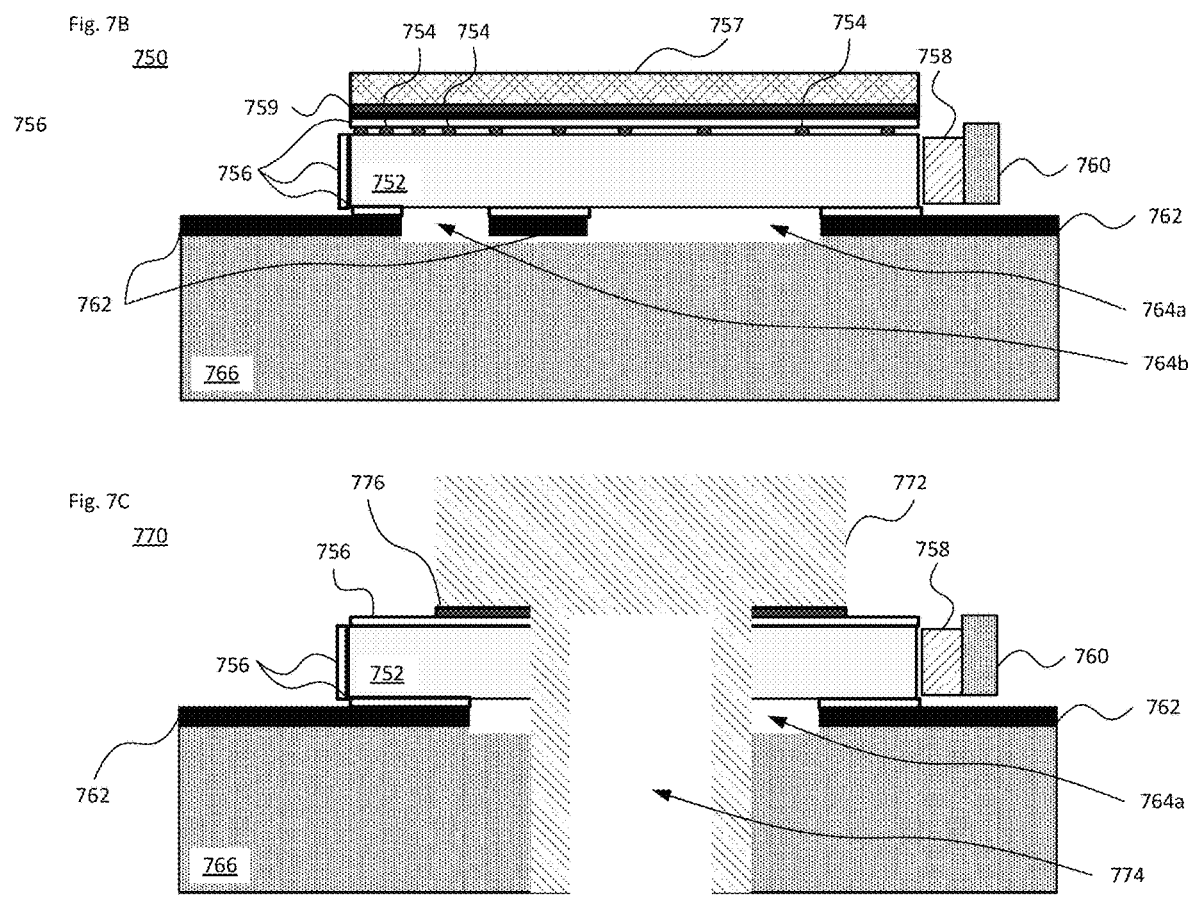

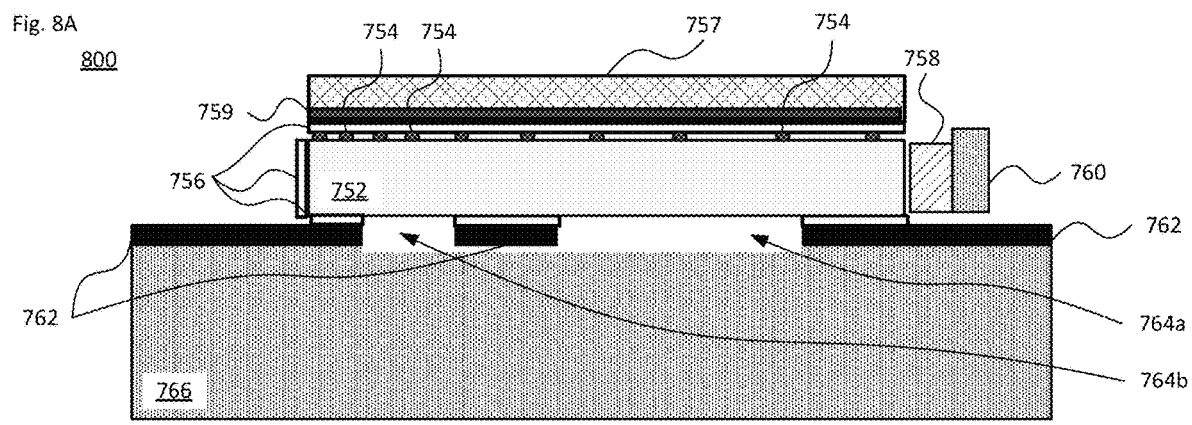
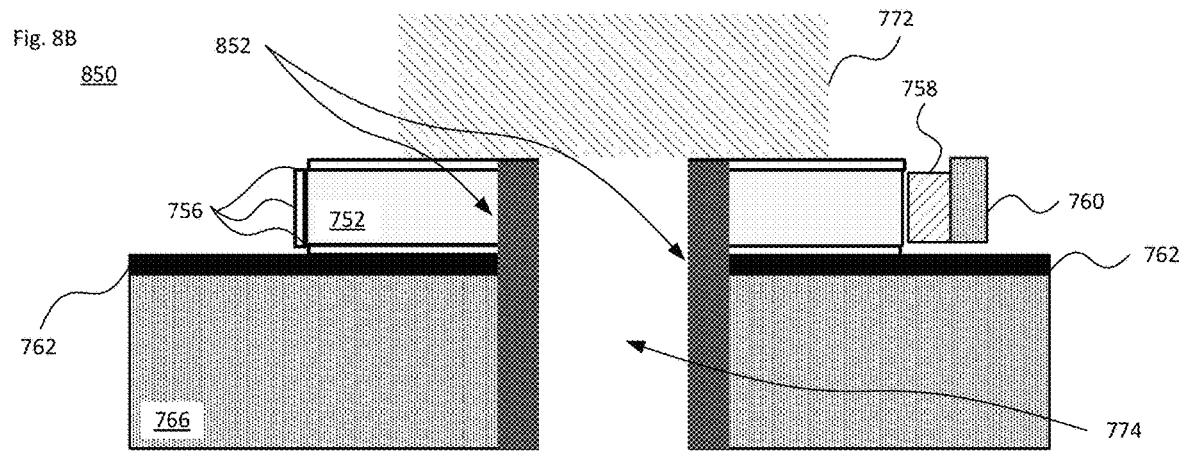

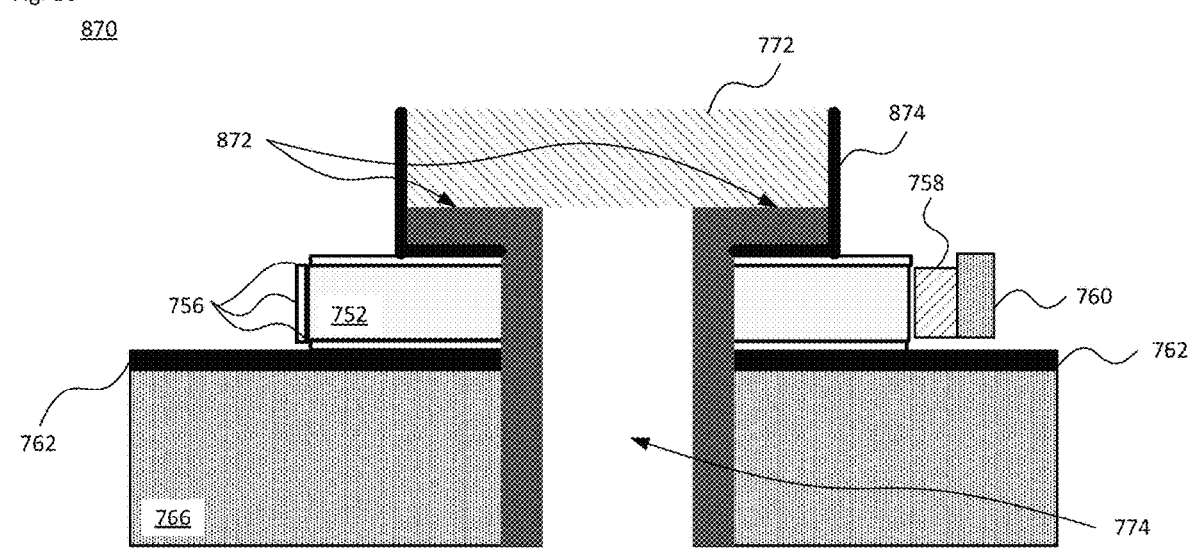

900

1000

1050

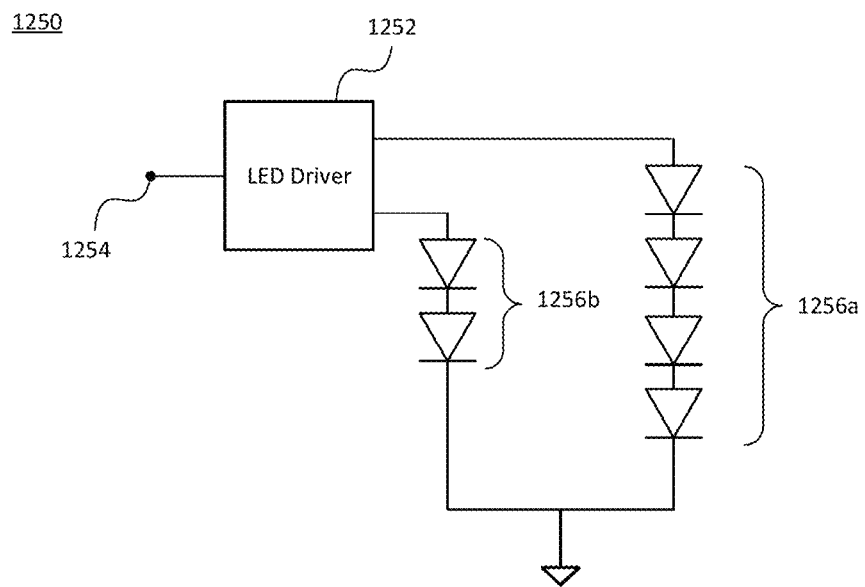

1300

AUTONOMOUS VEHICLE CONSOLE

CROSS-REFERENCE TO RELATED APPLICATIONS

This application is a continuation of U.S. patent application Ser. No. 16/929,321, filed Jul. 15, 2020, which claims the benefit of the filing date of U.S. Provisional Application No. 62/879,594, filed Jul. 29, 2019, the entire disclosures of which are incorporated by reference herein. This application is related to U.S. design application No. 29/688,952, filed Apr. 25, 2019 and issued as U.S. design Pat. No. D912,655 on Mar. 9, 2021, the entire disclosure of which is incorporated by reference herein.

BACKGROUND

In-vehicle communication systems may be located at different places within the vehicle. However, certain positions and arrangements may not be suitable for passenger-type vehicles able to operate in autonomous driving modes.

BRIEF SUMMARY

The technology relates to a console provided in a vehicle configured to operate in one or more self-driving modes for partial or fully autonomous driving operation. The console can be used as an interactive communication hub for passengers. It includes an audiovisual display with inputs for one or more client devices.

According to one aspect, an information console is provided for use in a vehicle configured to operate in an autonomous driving mode. The information console includes a monitor assembly, a lower endcap and an armrest. The monitor assembly is arranged to face one or more passengers in a second row of seats of the vehicle, in which the monitor assembly has a bottom edge and a top edge. The lower endcap is affixed to the bottom edge of the monitor assembly and is configured to be secured to a floor of the vehicle between a pair of seats in a first row of seats, the second row of seats being located behind the first row of seats. The armrest is affixed to the top edge of the monitor assembly. The monitor assembly includes a display screen and a notification region. The notification region includes one or more displayable icons and at least one device port for a communication device of a passenger. The notification region has a first section comprising an outer cover layer engaged with a first series of masking, diffuser and illuminating layers to selectively illuminate the one or more displayable icons. And the notification region has a second section comprising the outer cover layer engaged with a second series of masking, diffuser and illuminating layers to selectively illuminate the at least one device port for the communication device.

In an example, the at least one device port comprises a pair of device ports. Here, a first one of the device ports is arranged along a left side of the notification region and a second one of the device ports is arranged along a right side of the notification region. The one or more displayable icons may include a first icon disposed between the pair of device ports. The one or more displayable icons may further include a second icon disposed adjacent to the first device port and a third icon disposed adjacent to the second device port. In this case, the second and third icons are configured to identify a battery status upon illumination.

In another example, the first series of masking, diffuser and illuminating layers of the first section of the notification region includes: a light guide panel having a first surface facing the masking layer and a second surface opposite the first surface; a set of reflectors attached to one or more surfaces of the light guide panel including at least the second surface and a third surface adjacent to an end of the second surface; and a light emitting module operatively engaged with the light guide panel along a fourth surface thereof opposite the third surface. The masking layer includes one or more portions that are masked to block light emitted from the light guide panel and one or more portions that are unmasked to pass the light emitted from the light guide panel.

In one scenario, the console further comprises a diffusing pattern disposed along the second surface of the light guide panel, in which the diffusing pattern is configured to diffuse the light emitted from the light emitting module. The light guide panel may be configured to scatter the light emitted from the light emitting module.

The second series of masking, diffuser and illuminating layers of the second section of the notification region may include the device port optically coupled to the light guide panel, in which the device port includes a receptacle for the communication device, and the receptacle has an opening flush with an exterior surface of the outer cover layer. The device port may be adhesively affixed to the second surface of the light guide panel. The device port may include an illumination element arranged around at least part of the receptacle. The illumination element may be configured to diffuse or scatter the light emitted from the light emitting module. The illumination element may extend from the exterior surface of the outer cover layer through the light guide panel and into the device port.

The light emitting module may include a set of light emitting diodes distributed along the notification region. In this case, the set of light emitting diodes may be uniformly arranged along the notification region. The set of light emitting diodes may include a first set clustered in one or more areas of the notification region to selectively illuminate the at least one device port, and a second set clustered in one or more areas of the notification region to selectively illuminate the one or more displayable icons.

The fourth surface of the light guide panel may be enlarged relative to the second surface to operatively engage with the light emitting module. The outer cover layer may include a transparent white, grey or colored surface for areas of the notification region encompassing the one or more displayable icons, and a non-transparent surface for areas of the notification region not encompassing the one or more displayable icons.

According to another aspect, a vehicle comprising a control system having one or more processors configured to operate the vehicle in an autonomous driving mode based on objects and conditions in an environment external to the vehicle. The vehicle also comprises a user interface system operatively coupled to the control system, the user interface system including the information console described above. The information console is configured to communicate information about a trip to the one or more passengers in the second row of seats of the vehicle.

In an example, the first series of masking, diffuser and illuminating layers of the first section of the notification region includes: a light guide panel having a first surface facing the masking layer and a second surface opposite the first surface; a set of reflectors attached to one or more surfaces of the light guide panel including at least the second surface and a third surface adjacent to an end of the second surface; and a light emitting module operatively engaged with the light guide panel along a fourth surface thereof opposite the third surface. In this case, the masking layer including one or more portions that are masked to block light emitted from the light guide panel and one or more portions that are unmasked to pass the light emitted from the light guide panel. The control system of the vehicle is configured to control illuminance of the light emitting module. The control system of the vehicle may also be configured to control the illuminance depending on at least one of an amount of ambient light or an ambient temperature.

BRIEF DESCRIPTION OF THE DRAWINGS

FIGS. 3A-C illustrate interior cabin views of a vehicle in accordance with aspects of the technology.

FIGS. 7A-C illustrate another example of a light guide assembly configuration in accordance with aspects of the technology.

FIGS. 8A-C illustrate alternative examples of a light guide assembly configuration in accordance with aspects of the technology.

FIGS. 12A-B illustrate example circuits for a console in accordance with aspects of the technology.

DETAILED DESCRIPTION

The technology involves in-vehicle communication using a console positioned within the cabin of the vehicle. The console is configured to provide contextual information to passengers, regardless of whether the vehicle is operating in a partial or fully autonomous driving mode.

Figure 1A:
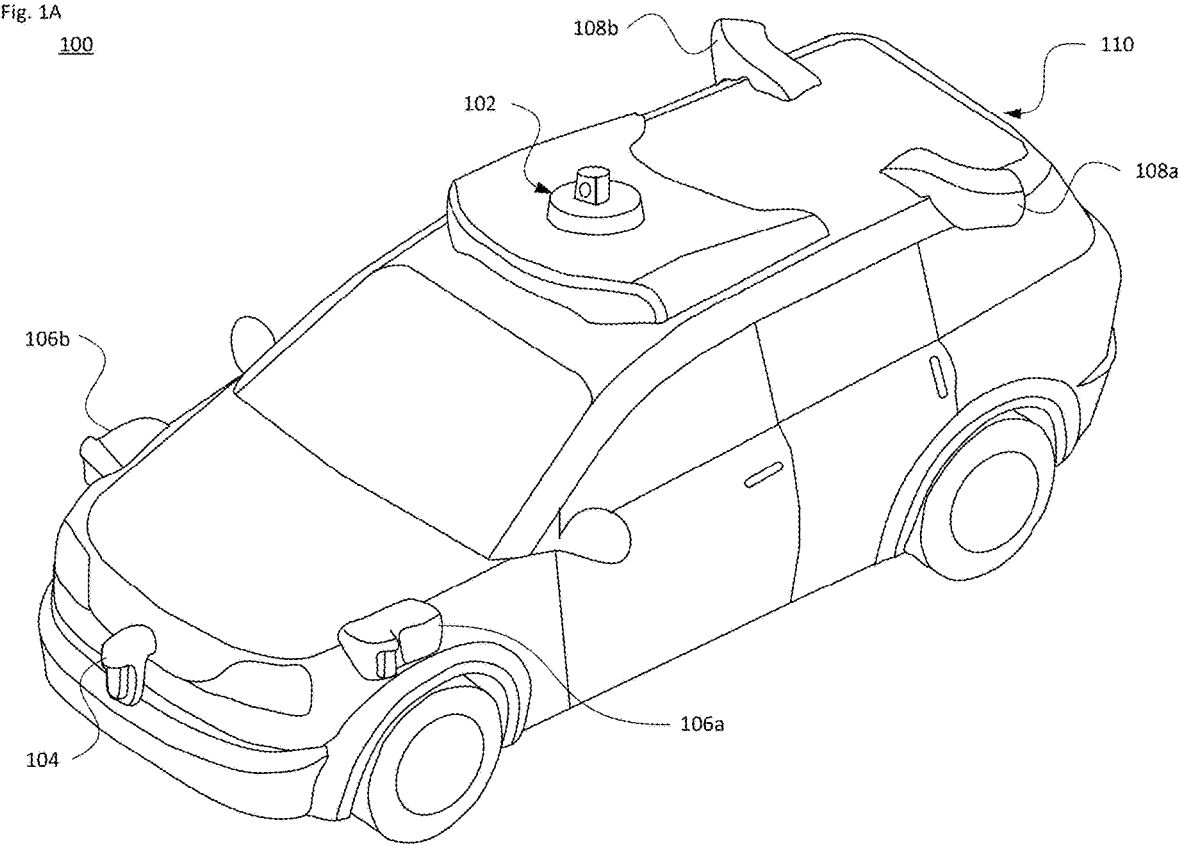
FIGS. 1A-B illustrate vehicles for use with aspects of the technology.
Figure 1B:
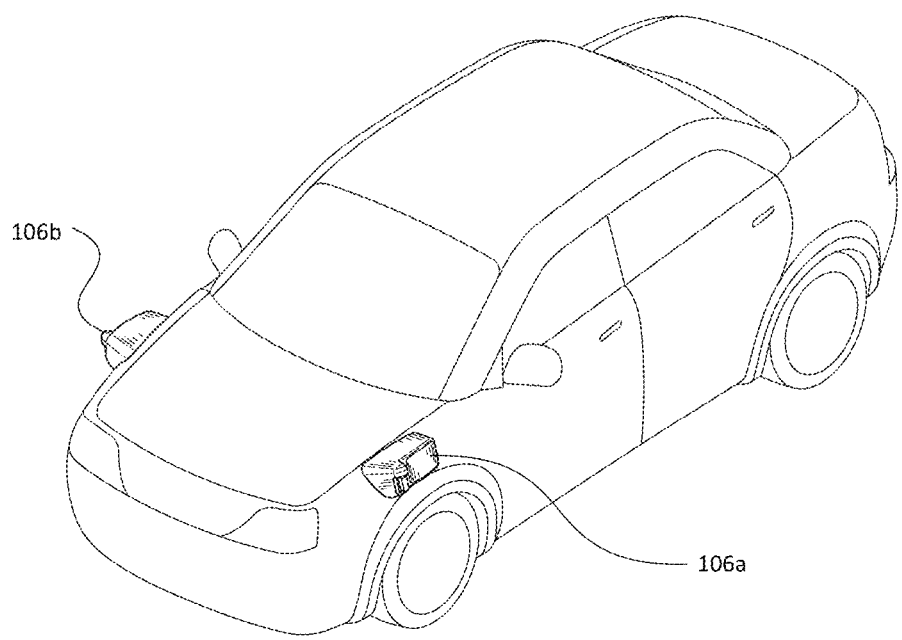

FIG. 1A illustrates a perspective view of an example passenger vehicle 100, such as a minivan or sport utility vehicle (SUV). FIG. 1B illustrates a perspective view of another example passenger vehicle 150, such as a sedan. The passenger vehicles may include various sensors for obtaining information about the vehicle's external environment. For instance, a roof-top housing unit (roof pod assembly) 102 may include a lidar sensor as well as various cameras (e.g., optical or infrared), radar units, acoustical sensors (e.g., microphone or sonar-type sensors), inertial (e.g., accelerometer, gyroscope, etc.) or other sensors (e.g., positioning sensors such as GPS sensors). Housing 104, located at the front end of vehicle 100, and housings 106a, 106b on the driver's and passenger's sides of the vehicle may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

By way of example, each sensor unit may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be different types of vehicles that can transport passengers in an autonomous driving mode, including, but not limited to, cars, buses, motorcycles, trolleys, recreational vehicles, etc., as well as package transport and delivery using cargo trucks, delivery vans, and the like.

While certain aspects of the disclosure may be particularly useful in connection with specific types of vehicles, the vehicle may be different types of vehicle including, but not limited to, sedans, minivans, SUVs, coupes, motorcycles, buses, recreational vehicles, emergency vehicles, cargo vehicles, construction equipment, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive fully autonomously without human assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
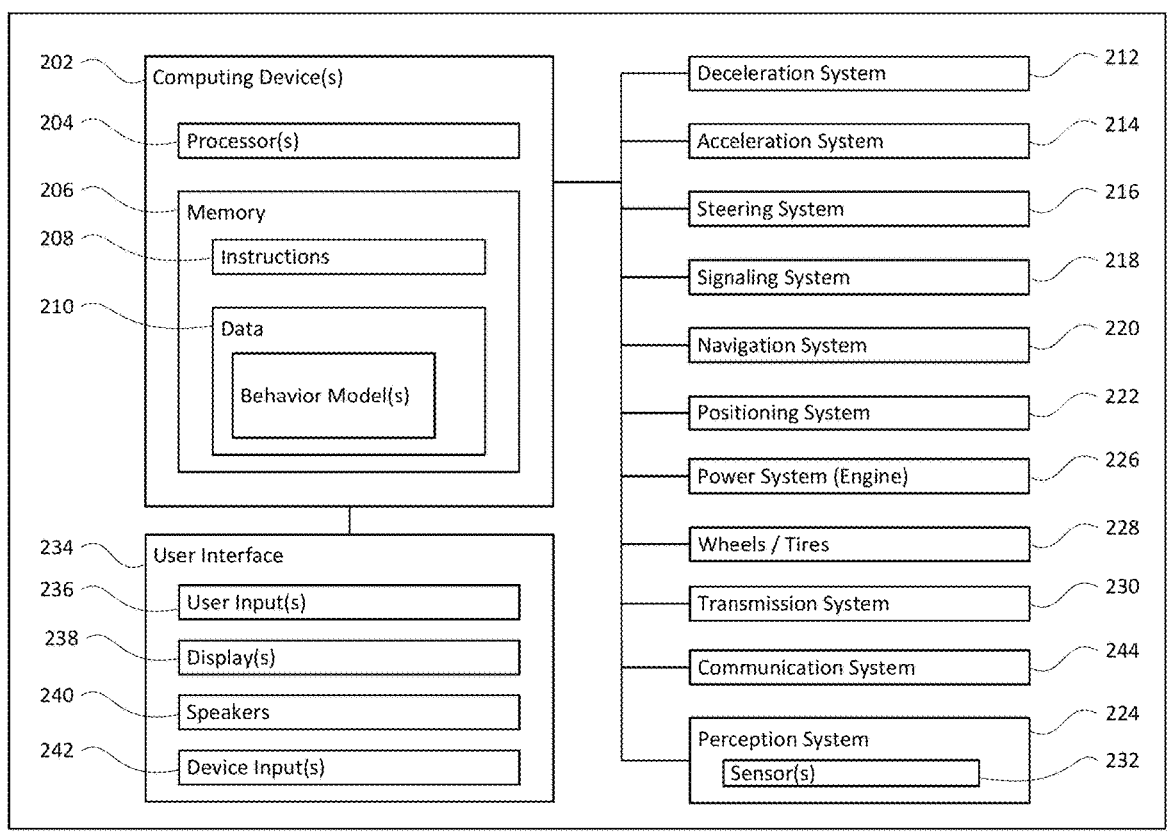
FIG. 2 illustrates vehicle systems in accordance with aspects of the technology.

FIG. 2 illustrates a block diagram 200 with various components and systems of an exemplary vehicle, such as passenger vehicles 100 or 150, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. The data 210 may include, for example, one or more behavior models regarding the vehicle itself, as well as other objects expected to be encountered in the environment in which the vehicle drives (e.g., road users such as other vehicles, bicycles, pedestrians, etc.)

The processors 204 may be any conventional processors, such as commercially available central processing units (CPUs) or graphics processing units (GPUs). Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system is configured to communicate with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose). The autonomous driving computing system may employ a planner module in accordance with the navigation system 220, the positioning system 222 and/or other components of the system, e.g., for determining a route from a starting point to a destination or for making modifications to various driving aspects in view of current or expected traction conditions. By way of example, the planner module may determine a route upon receipt of a request to pick up a rider. The request may be received by the vehicle from a backend system, such as a fleet management system.

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module, by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The sensors 232 are located in one or more sensor units around the vehicle, such as shown in FIGS. 1A-1B. The detected objects may be other vehicles, obstacles in the roadway, traffic signals, signs, trees, bicyclists, pedestrians, etc. The sensors 232 may also detect certain aspects of weather or other environmental conditions, such as snow, rain or water spray, or puddles, ice or other materials on the roadway.

By way of example only, the perception system 224 may include one or more light detection and ranging (lidar) sensors, radar units, cameras (e.g., optical imaging devices, with or without a neutral-density filter (ND) filter), positioning sensors (e.g., gyroscopes, accelerometers and/or other inertial components), infrared sensors, acoustical sensors (e.g., microphones or sonar transducers), and/or any other detection devices that record data which may be processed by computing devices 202. Such sensors of the perception system 224 may detect objects outside of the vehicle and their characteristics such as location, orientation, size, shape, type (for instance, vehicle, pedestrian, bicyclist, etc.), heading, speed of movement relative to the vehicle, etc.

The perception system 224 may also include other sensors within the vehicle to detect objects and conditions about or within the vehicle, such as in the passenger compartment. For instance, such sensors may detect, e.g., whether a door is open or closed, the presence of one or more persons, pets, packages, etc. within the vehicle, as well as conditions within and/or outside the vehicle such as temperature, humidity, etc. This can include detecting where the passenger(s) is sitting within the vehicle (e.g., front passenger seat versus second or third row seat, left side of the vehicle versus the right side, etc.). The interior sensors may detect the proximity, position and/or line of sight of the passengers in relation to one or more display devices of the passenger compartment. Still further sensors 232 of the perception system 224 may measure the rate of rotation of the wheels 228, an amount or a type of braking by the deceleration system 212, and other factors associated with the equipment of the vehicle itself.

The raw data obtained by the sensors can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely, e.g., via adjustments made by planner module, including adjustments in operation to deal with occlusions and other issues. In addition, the computing devices 202 may perform calibration of individual sensors, all sensors in a particular sensor assembly, or between sensors in different sensor assemblies or other physical housings.

Computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display, such as a console, may be located within a cabin of the vehicle (not shown) and may be used by computing devices 202 to provide information to passengers within the vehicle. By way of example, displays may be located, e.g., along the dashboard, on the rear of the front row of seats, on a center console between the front row seats, along the doors of the vehicle, extending from an armrest, etc. Other output devices, such as speaker(s) 240 may also be located within the passenger vehicle. One or more device inputs 242 may, e.g., be incorporated into the center console or other module within the cabin of the vehicle.

The passenger vehicle also includes a communication system 244. For instance, the communication system 244 may also include one or more wireless configurations to facilitate communication with other computing devices, such as passenger computing devices within the vehicle, computing devices external to the vehicle such as in another nearby vehicle on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 3A:
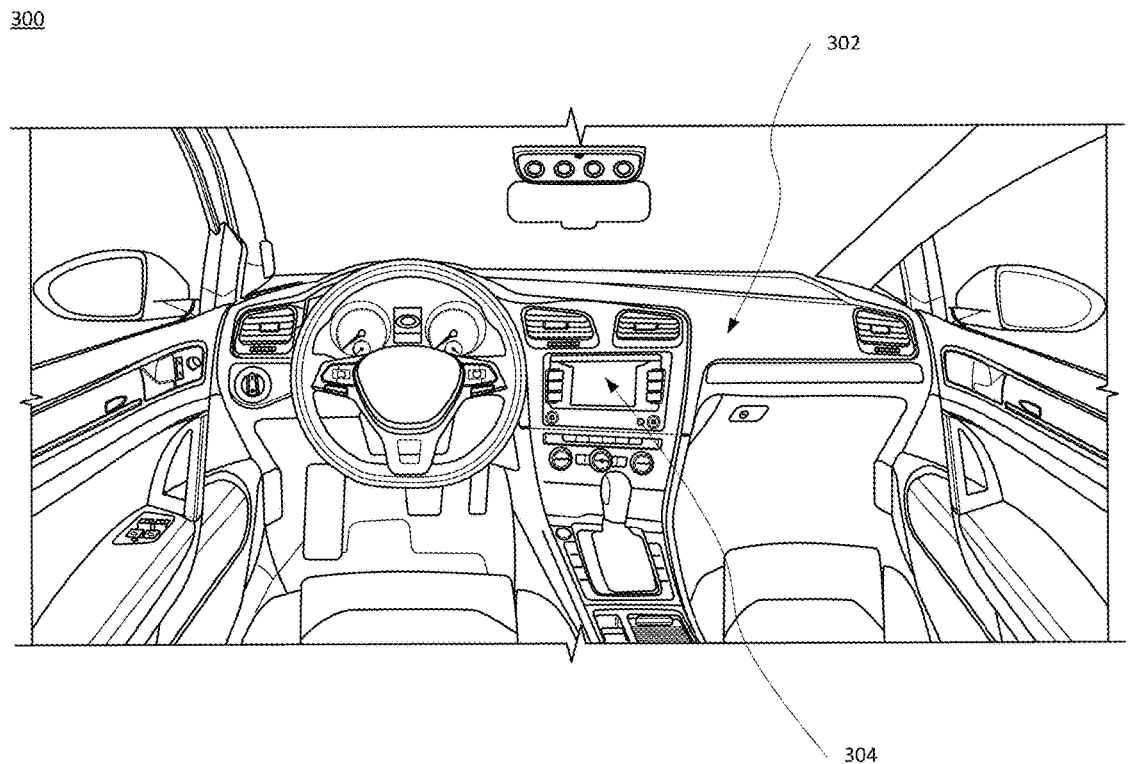

Turning to FIG. 3A, this figure illustrates an example view 300 within the cabin of the vehicle 100 or vehicle 150, for instance as seen from the front seats. In this view, a dashboard or console area 302 which includes an internal electronic display 304 is visible. Although vehicle 100 or 150 includes a steering wheel, gas (acceleration) pedal, or brake (deceleration) pedal which would allow for a semi-autonomous or manual driving mode where a passenger would directly control the steering, acceleration and/or deceleration of the vehicle via the drivetrain, these inputs are not necessary for a fully autonomous driving mode. Rather, passenger input may be provided by interaction with the vehicle's user interface subsystem 234 and/or a wireless network connection for an app on the passenger's mobile phone or other personal computing device, such as via the communication system 244. By way of example, the internal electronic display 304 may include a touch screen or other user input device for entering information by a passenger such as a destination, etc. Alternatively, internal electronic display 304 may merely provide information to the passenger(s) and need not include a touch screen or other interface for user input.

Figure 3B:
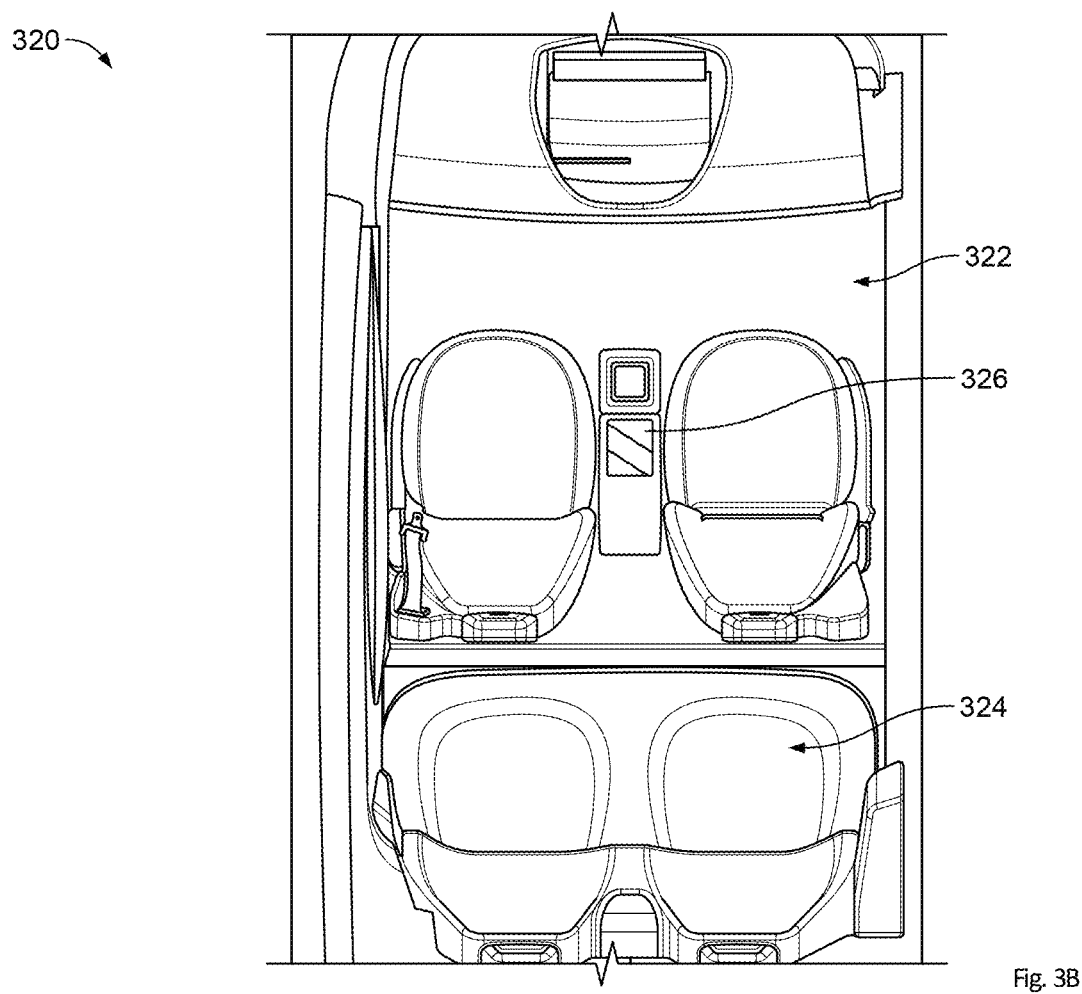

FIG. 3B illustrates a top-down view 320 of a vehicle cabin of an example vehicle, such as vehicle 100 of FIG. 1A or vehicle 150 of FIG. 1B. As shown, the cabin includes a front seat area 322 and a rear seat area 324. A center console 326 may be disposed between the front seats. FIG. 3C presents a view 340 from the second row of seats of the vehicle. Here, console 326 is visible positioned between the front seats. In view 430, display screen 342 of the console is shown facing the second row of seats for easy viewings and access by passengers.

Console Configurations

Figure 4A:
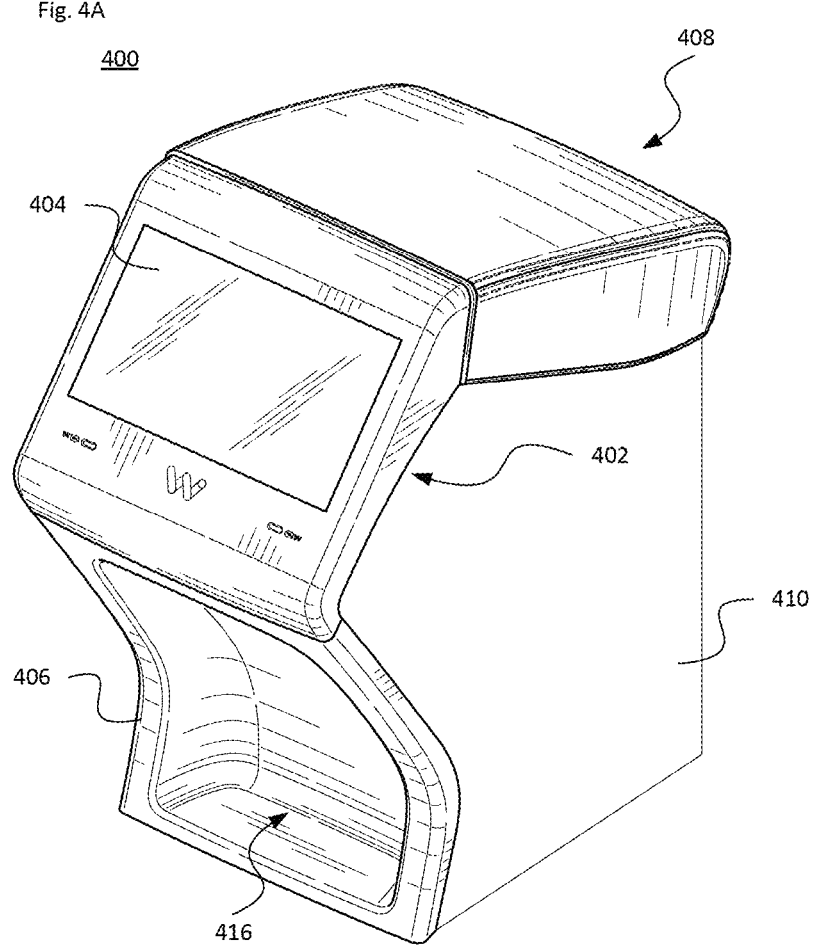
FIGS. 4A-F illustrate views of an autonomous vehicle console in accordance with aspects of the technology.
Figure 4B:
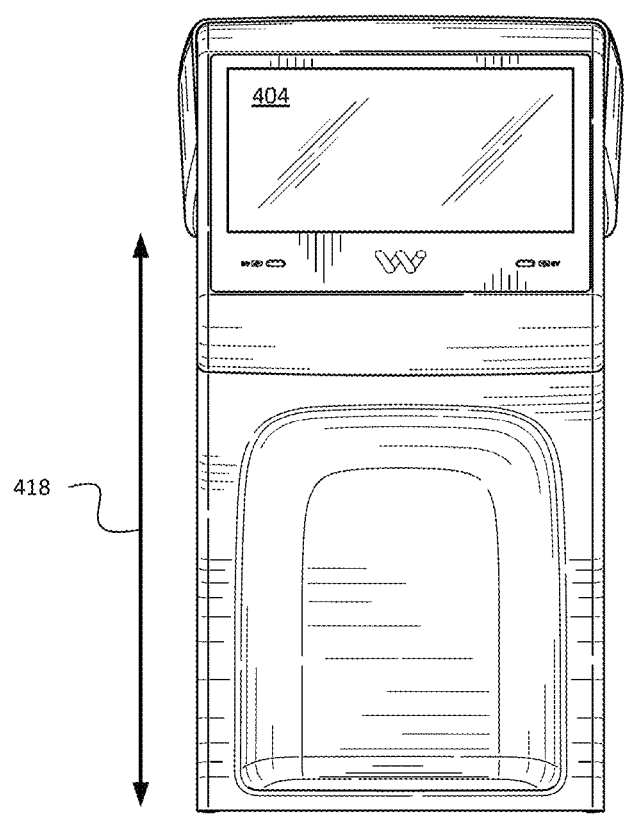
Figure 4C:
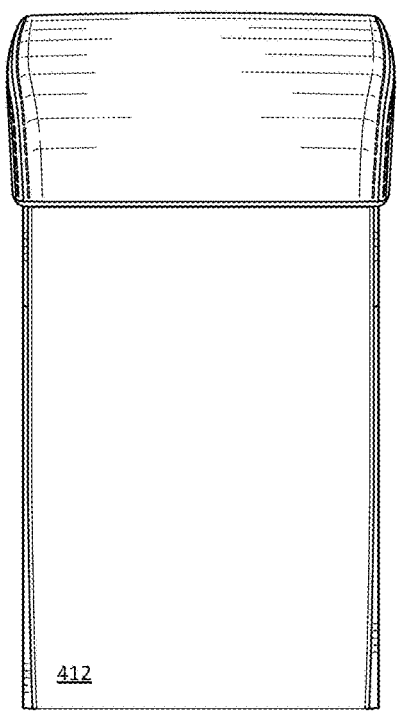
Figure 4D:
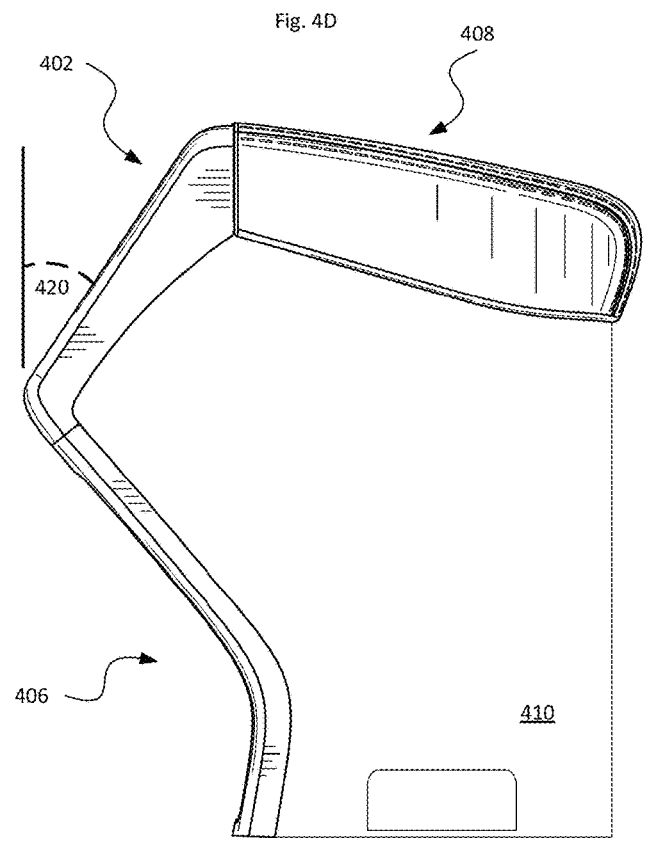
Figure 4E:
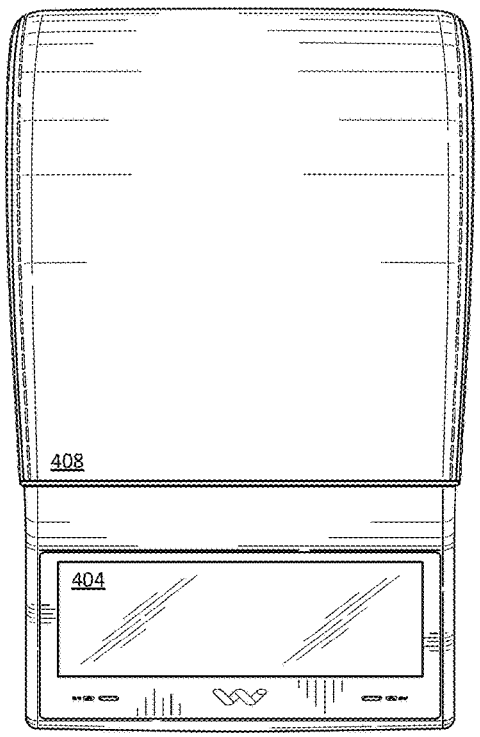
Figure 4F:
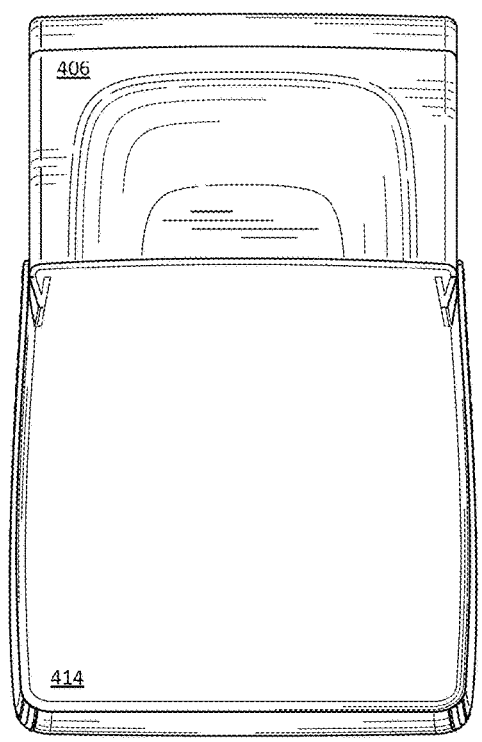

FIGS. 4A-E illustrate one example 400 of a console configured for arrangement between the front seats of the autonomous vehicle, or between the second row of seats in a three-row vehicle such as a minivan. In other types of vehicles (e.g., buses), the console may be positioned in other locations. FIG. 4A is a perspective view, FIG. 4B is a front view, FIG. 4C is a rear view, FIG. 4D is a right-side view, FIG. 4E is a top view, and FIG. 4F is a bottom view.

As shown in the example 400, a monitor assembly 402 includes a display 404 positioned for viewing by passengers in the rear seats. A lower endcap 406 is positioned beneath the monitor assembly 402 and an armrest 408 extends from the top of the monitor assembly forward towards the dashboard. A pair of side panels 410 are affixed to the left and right sides of the monitor assembly 402, armrest 408 and lower endcap 406, as shown in the right-side view of FIG. 4D, where the left side view is a mirror image of the right. A panel 412, shown in the view of FIG. 4C, is disposed opposite the monitor assembly 402, such as to face the front of the cabin of the vehicle.

System electronics, such as user interface components for the communication hub, may be received within the housing. According to one scenario, the armrest is immovable with base 414 (see FIG. 4F) being secured to the cabin floor so that passengers do not have access to the interior of the housing. As shown in the perspective view of FIG. 4A, the lower endcap 406 may include a concave or otherwise recessed section 416 to provide extra legroom to the passengers, or to store a bag, package or the like during a trip.

According to one aspects of the technology, the monitor assembly 402 includes an interactive-capable touchscreen as the display 404. The touchscreen may be, for instance, arranged in a landscape orientation. The touch screen may provide information about a trip, including route, destination and/or traffic information. In one example the display screen is on the order of 8" along the diagonal. The assembly is arranged to maximize reachability and readability by passengers in the rear seat. For instance, the touchscreen may be positioned at a height 418 (FIG. 4B) of 0.3 m-1.3 m above the floor, or more or less. Thus, the lower endcap may be, e.g., 0.2 m-1.2 m high. As seen in the side view of FIG. 4D, the touchscreen may be tilted at an angle 420 of between 0° and 35° with respect to a line or plane perpendicular to the floor.

Figure 5A:
FIGS. 5A-B illustrates console features in accordance with aspects of the technology.

The monitor assembly also includes one or more device connections, such as a pair of USB C ports. Status and/or other information may be displayed along a notification region of the monitor assembly. As shown in example 500 of FIG. 5A, notification region 502 may be arranged in a planar manner beneath touchscreen 504. In this example, device ports 506 may be, e.g., 20-80 mm below the touchscreen. The pair of USB C ports may be positioned on the right and left sides of the notification region 502 as illustrated in FIG. 5A, so that passengers in the rear seats may easily access them.

The device port(s) 506 may be configured to blend into the notification region 502. However, in order to show passengers where to plug in, each port may be illuminated or otherwise accented. For instance, silicon rubber trim may be arranged around each port, such as in an oval shape. LED or other backlighting may be used to light the trim with a particular color. By way of example, the notification region may include an outer glass or plastic layer with one or more series of masking, diffuser and illuminating layers. These layers can be used to illuminate the icons or other indicators, which may comprise one or more translucent inks. By way of example, grey, white and/or color translucent inks may be used. Silicone rubber or other materials may be used as trim around particular elements on the surface of the notification region, such as the ports.

Figure 5B:
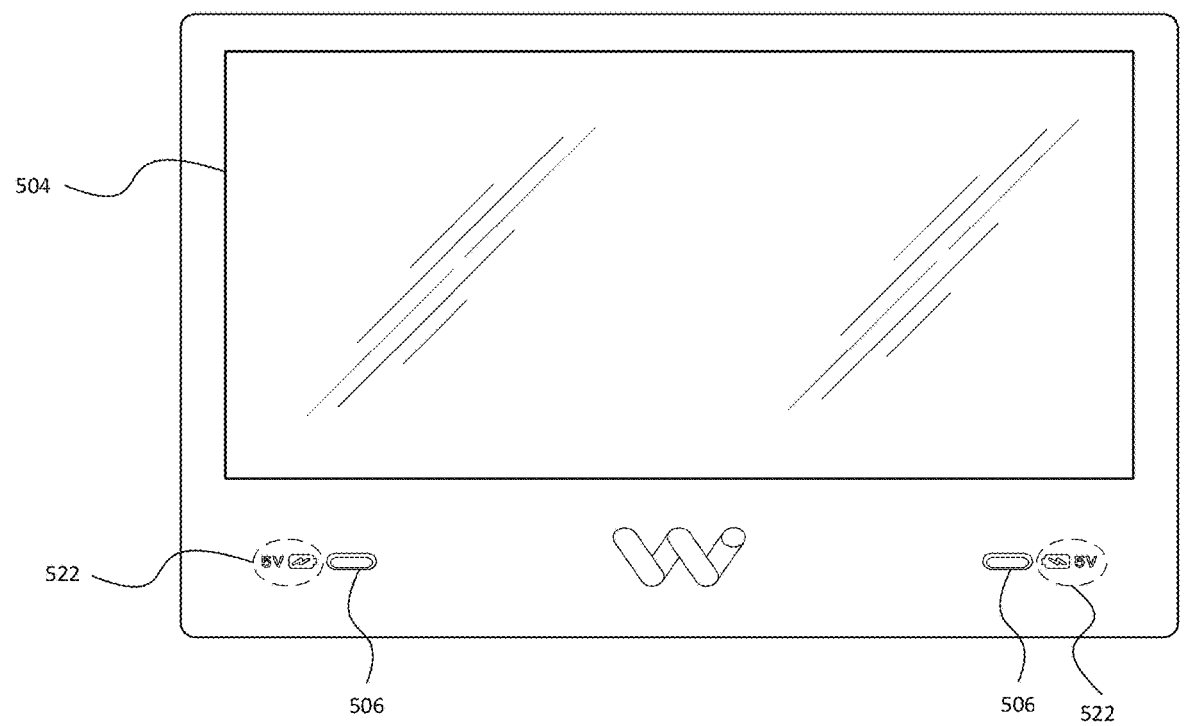

FIG. 5B is an enlarged view 520 of the monitor assembly area of the console. As shown in this view via dashed areas 522, the notification region may include information about battery or charging status for each client device coupled to the monitor assembly. For instance, voltage and/or charging icons may be displayed. Logos, badges and other information may also be presented with icons of various sizes, shapes, colors, etc. By way of example, the icons may be printed with different color paint or translucent ink, or laser etched into a glass or plastic surface of the notification region, and backlit as needed.

Different arrangements of masking, diffuser and illuminating layers may be used for active lighting, depending on the icons, ports and other elements arranged along the notification region. For instance, one or more icons may have the same type of layered arrangement, while the USB port(s) may have a different layered arrangement. Regardless of the arrangement, the lighting should be diffuse without hotspots or unevenness. The lighting scheme should maintain sufficient contrast, and selected icons should be visible even when active illumination is off.

Figure 6A:
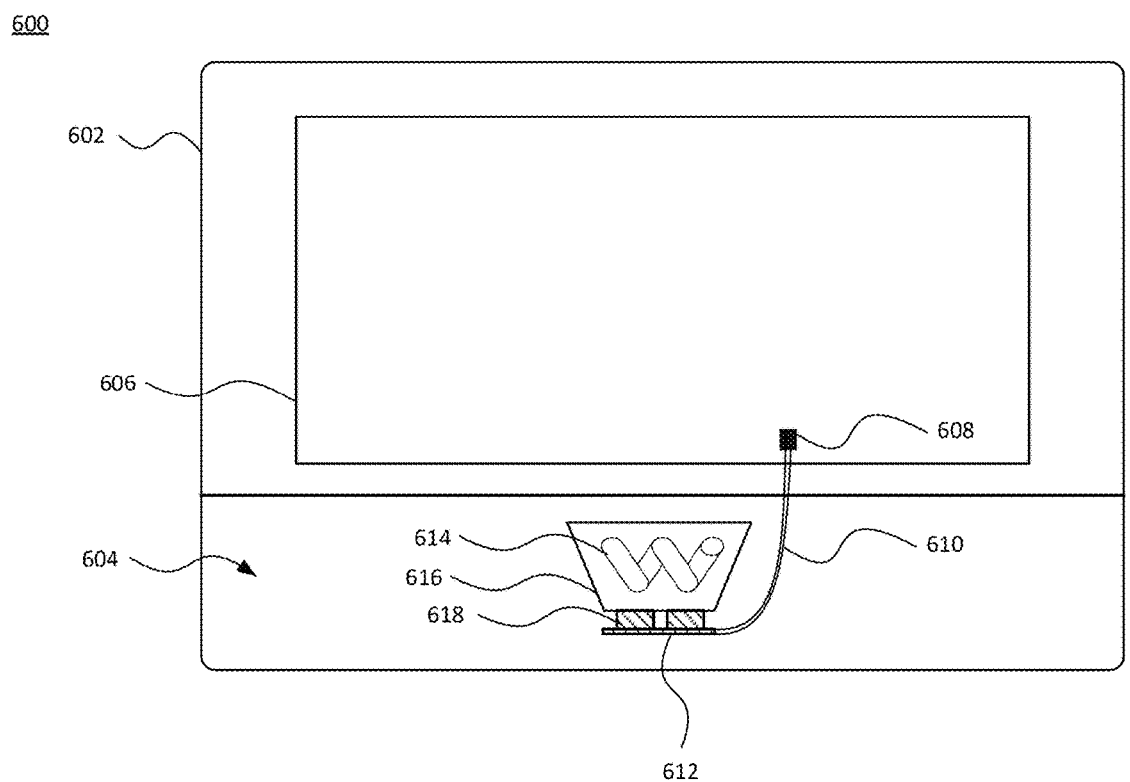
FIGS. 6A-C illustrate an example of a light guide assembly configuration in accordance with aspects of the technology.
Figure 6B:
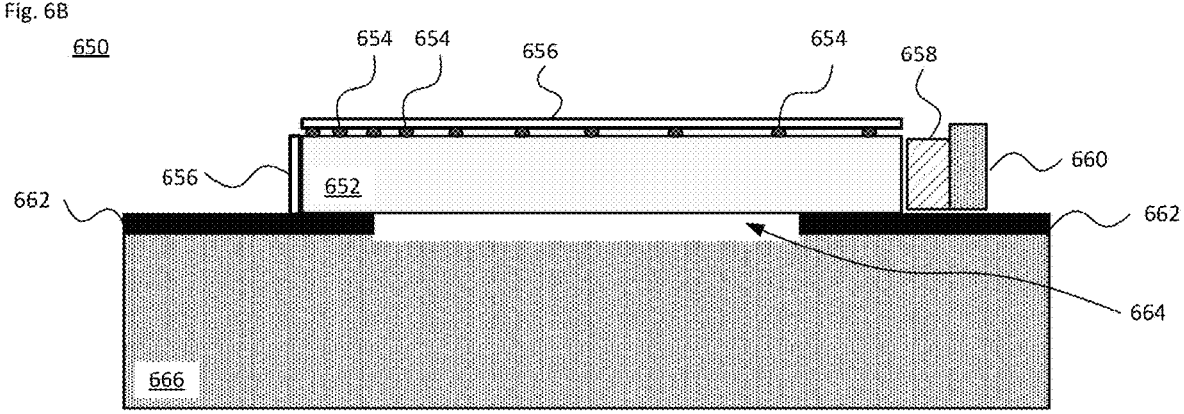

Different arrangements and configurations of the various lighting layers are possible. FIGS. 6A-B illustrate one configuration, in which a tailored light guide arrangement is used to illuminate a particular icon in the notification region of the monitor assembly. In particular, FIG. 6A illustrates a view 600 showing a portion 602 of the monitor assembly, with notification region 604 disposed along a first (e.g., bottom) section of the assembly. As shown, a controller section 606 includes a connection point 608, from which a flexible printed circuit 610 connects to a printed circuit board 612 along the notification region 604. In this example, an icon such as logo 614 is disposed centrally along the notification region, although it may be arranged anywhere along the notification region. Here, a small trapezoid-shaped light guide panel 616 may be applied for logo illumination, where the light guide panel 616 is illuminated via a set of light emitting diodes (LEDs) 618 that are operatively coupled to the control section 606 via the flexible printed circuit 610 and the printed circuit board 612.

Figure 6C:
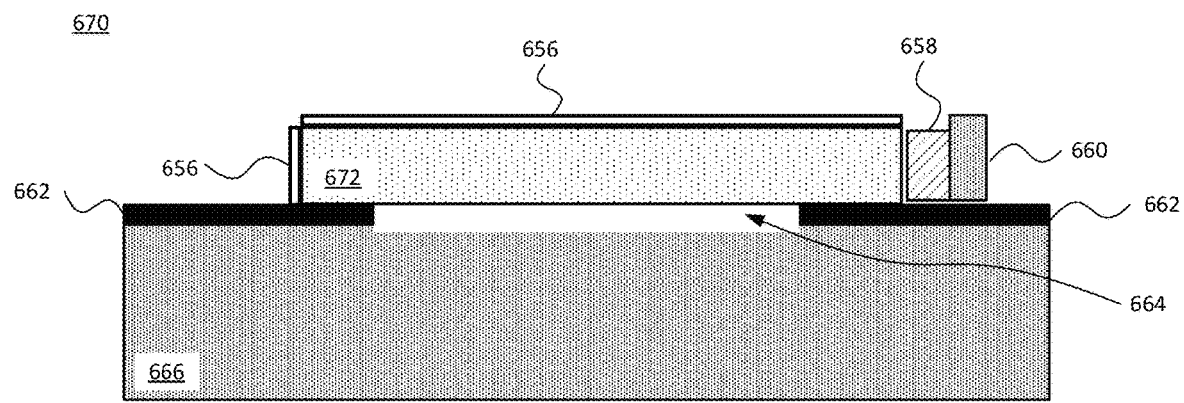

FIG. 6B illustrates a cross-sectional view 650 of one configuration of a light guide assembly usable as the light guide panel and accompanying active illumination elements. In this configuration, the light guide assembly has a light guide panel 652 with a diffusing pattern 654, and a set of reflectors 656 attached to surfaces of the light guide panel 652. According to one example, the light guide panel 652 may be formed of a clear polycarbonate or acrylic material. A set of LEDs 658 are disposed along one end of the light guide panel 652, and are attached to printed circuit board 660, which is operatively coupled to the control section as discussed above. This arrangement is disposed adjacent to an exterior section of the notification region. One or more portions 662 of this exterior region are masked with, e.g., a black or other dark color that blocks the light from the LEDs. And one or more other portions 664 of the exterior region are unmasked. These portions 664 are for the icons or other indicators along the notification region. As noted above, such portions may be printed with different color paint or translucent ink. A cover material 666 is disposed over the portions 662 and 664 (which may be co-planar, as shown). The cover material 666 may be, e.g., glass or plastic. Depending on the color(s) used for portions 664, the logo, icon or other indicator (e.g., 614 in FIG. 6A) may have a first appearance when illuminated, and a different appearance when not illuminated. FIG. 6C illustrates an alternative view 670, which omits the diffusing pattern 654 but provides a light guide panel 672 that includes scatter. In this example, the light guide panel 672 may be formed of an acrylic base material with diffuser particles incorporated into the base material.

While not shown in the views of FIGS. 6A-C, the light guide panel may also be used to illuminate other icons (e.g., battery charger icons) and device ports (e.g., USB-C connectors). Alternatively, the indicator illumination for one indicator (e.g., icon 614) may be controlled through the assembly of FIG. 6B or 6C, while illumination for device ports and charger logos (see, e.g., 506 and 522 of FIG. 5B) may be controlled by a device port module (e.g., a USB-C module). In one scenario, the illuminance of the light guide assembl(ies) can be controlled by pulse width modulation (PWM) control from the vehicle's processing system (e.g., computing devices 202 of FIG. 2). This may be done, by way of example only, depending on the amount of ambient light in the vehicle cabin, the ambient temperature, etc.

Figure 7A:
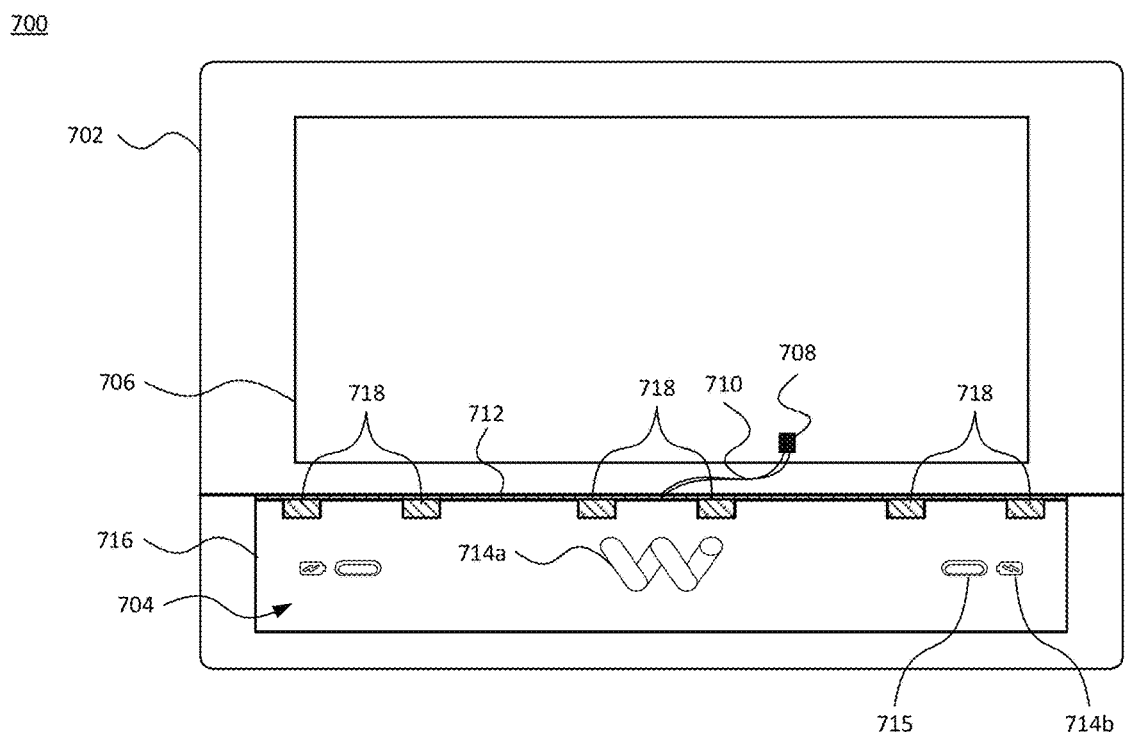

FIGS. 7A-C illustrate another configuration, in which a light guide arrangement is used to illuminate a set of icons and ports in the notification region of the monitor assembly. In particular, FIG. 7A illustrates a view 700 showing a portion 702 of the monitor assembly, with notification region 704 disposed along a first (e.g., bottom) section of the assembly. As shown, a controller section 706 includes a connection point 708, from which a flexible printed circuit 710 connects to a printed circuit board 712 along the notification region 704. In this example, an icon such as logo 714a is disposed centrally along the notification region, although it may be arranged anywhere along the notification region. Other icons 714b, such as battery charging icons, may be disposed adjacent to device ports 715. Here, a long rectangular light guide panel 716 is configured for illumination by LEDs 718 in order to illuminate the icons 714 and device ports 715 (e.g., USB-C rings).

FIG. 7B illustrates a cross-sectional view 750 of a configuration of a light guide assembly usable as the light guide panel and accompanying active illumination elements. In this configuration, the light guide assembly has a light guide panel 752 with a diffusing pattern 754, and a set of reflectors 756 attached to surfaces of the light guide panel 752. In this configuration, a covering housing 757 is disposed along one side of the light guide panel 752 opposite the exterior cover glass or plastic element. A foam tape, glue or other adhesive element 759 can be used to secure the device port to the reflectors along one side of the light guide panel. A set of LEDs 758 are disposed along one end of the light guide panel 752, and are attached to printed circuit board 760, which is operatively coupled to the control section as discussed above. This arrangement is disposed adjacent to an exterior section of the notification region. As shown, portions 762 of this exterior region are masked with, e.g., a black or other dark color that blocks the light from the LEDs. And portions 764a and 764b of the exterior region are unmasked, such as to illuminate logos 714a and 714b, respectively. As noted above, such portions may be printed with different color paint or translucent ink. A cover material 766 is disposed over the portions 762 and 764 (which may be co-planar, as shown). The cover material 766 may be, e.g., glass or plastic. Depending on the color(s) used for portions 764, the logo, icon or other indicator may have a first appearance when illuminated, and a different appearance when not illuminated.

FIG. 7C illustrates a view 770, which illustrates how the device port(s) may be illuminated. Here, the configuration is similar to that of FIG. 7B. In this case, a device port 772 having a receptacle 774, such as a USB-C module, is disposed along the notification region and may pass through the layers containing the light guide panel, the mask and unmasked portions, and the cover material. A foam tape, glue or other adhesive element 776 can be used to secure the device port to the reflectors along one side of the light guide panel.

In the example of FIGS. 7A-C, the illumination areas in the cover materials can have a transparent white, grey or colored paint or a clear look, and other areas can have non-transparent black paint. The printed circuit board 760 that drives the LEDs 758 is connected to the display controller section, and all illuminations can be controlled together through the display controller section. This can include turning on (and off) individual LEDs or groups of LEDs to illuminate one or more logos and/or the device port(s).

Figure 9:
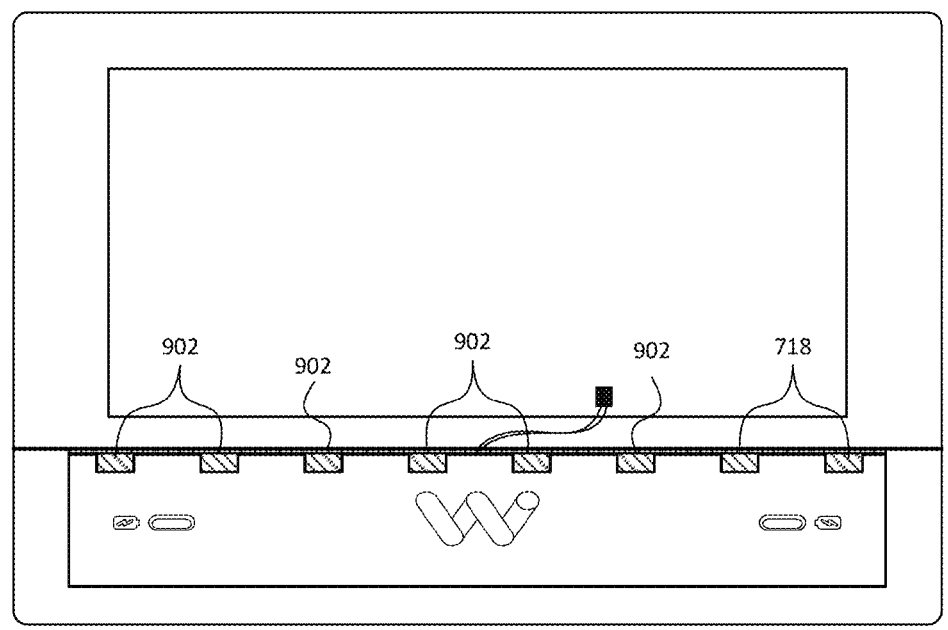
FIG. 9 illustrates another example of a light guide assembly configuration in accordance with aspects of the technology.

FIGS. 8A-B illustrate another configuration that is a variation of FIGS. 7B-C. As shown in view 800 of FIG. 8A, the adhesive element 759 may be omitted, while the remainder of the components are the same. Similarly, as seen in view 850 of FIG. 8B, adhesive element 776 may also be omitted. In addition or alternatively, an illumination ring component 852 is employed around the receptacle 774 (e.g., partly or fully encircling the receptacle interior surface). In one scenario, the illumination ring component 852 comprises a transparent material that scatters light. Here, light from the light guide panel 752 enters the illumination ring, is scattered, and then is emitted to the outside of the assembly (away from the exterior surface of the cover material 766). FIG. 8C illustrates a view 870 that is a variation of view 850 of FIG. 8B. Here, illumination ring component 872 is extended inside the device port (e.g., USB-C module) 772 with a mechanical fixing structure 874. And alternatively or additionally, as shown in view 900 of FIG. 9, the series of LEDs 902 may be uniformly arranged in an LED bar. In contrast, as shown in view 700 of FIG. 7A, the LEDs 718 may be divided into different groups clustered in the areas adjacent to for the logo/icon and device port areas.

Figure 10A:
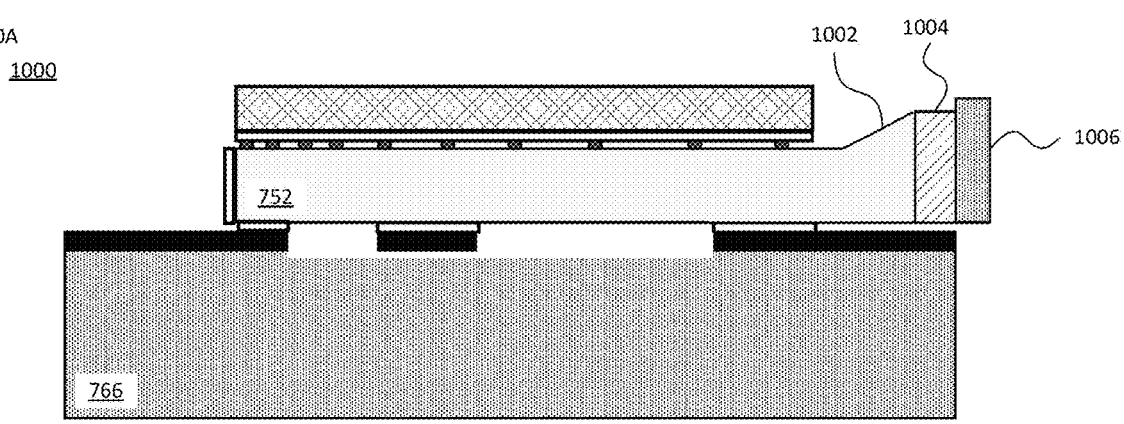
FIGS. 10A-B illustrate a further example of a light guide assembly configuration in accordance with aspects of the technology.
Figure 10B:
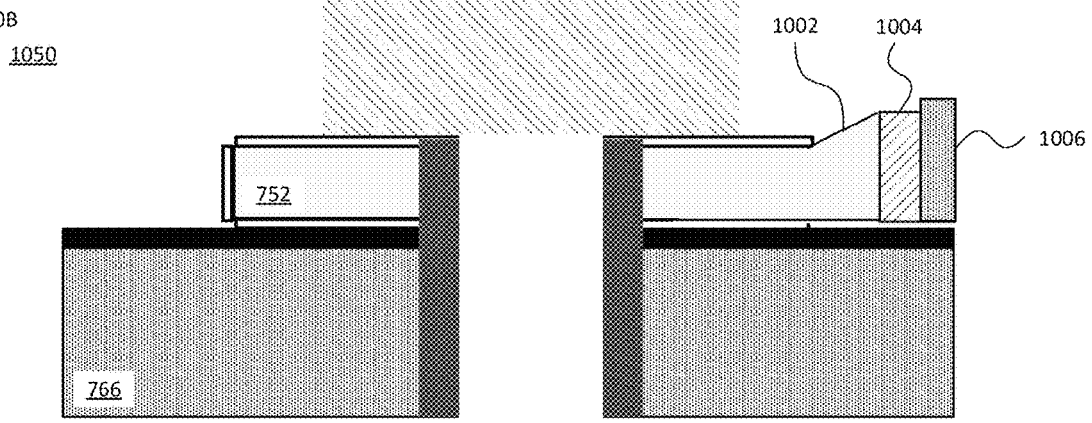

In yet another scenario as shown by views 1000 and 1050 of FIGS. 10A and 10B, respectively, light input area 1002 of the light guide panel 766 may be thicker than other areas. This is for maximize light input efficiency. For instance, there may be a limitation in light guide panel thickness due to a limitation of the device port length. Thus, in this case, in order to apply a larger and & brighter LED (or other illuminator), the thickness of the light guide panel in the LED lit area is increased. As shown, LED 1004 is relatively larger than the LEDs 658 or 758 from FIGS. 6B-C or 7B-C. Correspondingly, printed circuit board 1006 may be relatively larger than printed circuit boards 660 or 760.

Figure 11:
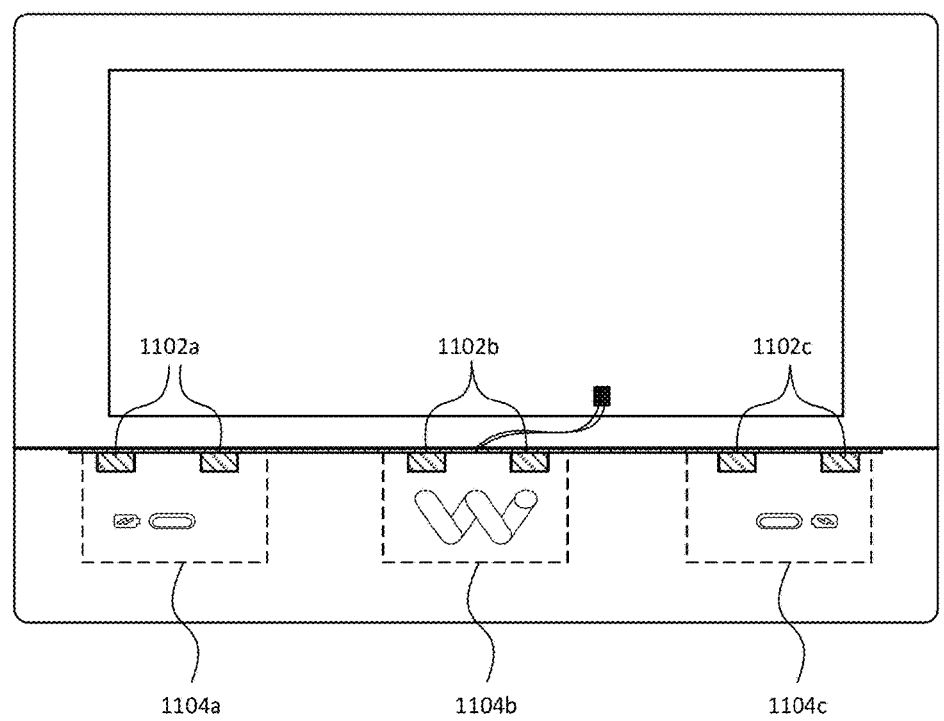
FIG. 11 illustrates another example of a light guide assembly configuration in accordance with aspects of the technology.

And in yet another scenario as shown by view 1100 of FIG. 11, the light guide panel is divided into three pieces for optimizing each area light efficiency, one for the logo area and two for dual device port areas. In particular, as shown in this example three pairs of LEDs 1102a, 1102b and 1102c service one of the three light guide panels 1104a, 1104b and 1104c, respectively. In this example, panels 1104a and 1104c may each encompass a device port and battery charging logo, while panel 1104b encompasses a central logo disposed between the two device ports. By way of example, panel 1104b may have any of the configurations shown in FIG. 6B, 6C, 7B, 8A or 10A, while panels 1104a and 1104c may have any of the configurations shown in FIG. 7C, 8B, 8C or 10B.

Figure 12A:
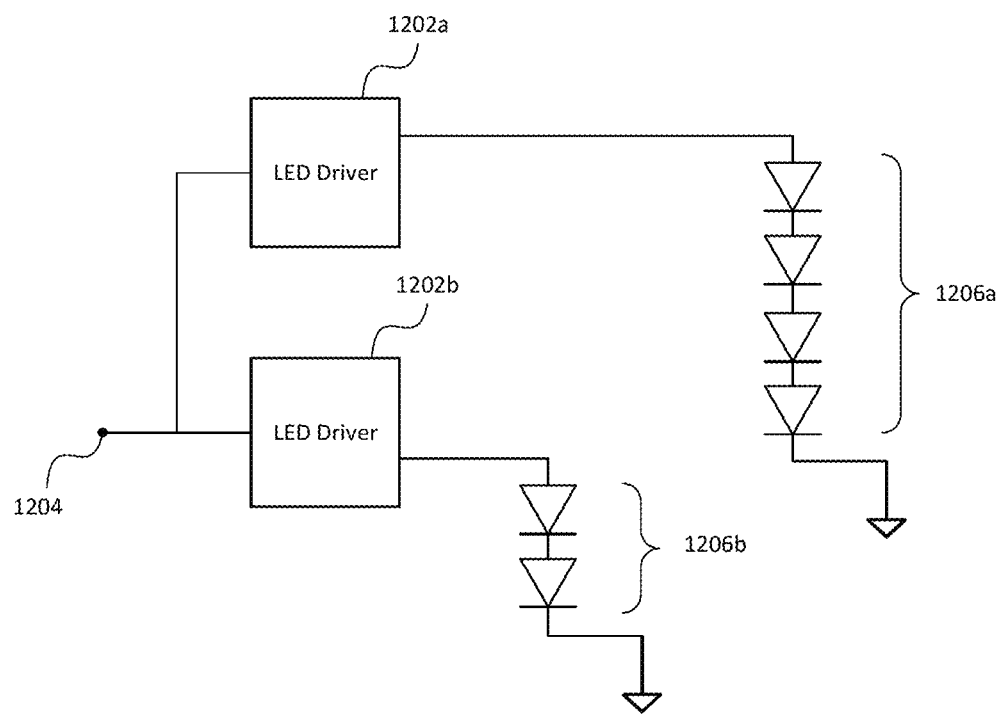

In addition, the different parts of the light guide panel may be illuminated using one or more LED driver modules. For instance, as shown in example 1200 of FIG. 12A, a pair of drivers 1202a and 1202b may share a common input via node 1204. In this example, the LED driver 1202a may be used to control illumination of a set of LEDs 1206a along one or more parts of the notification region, such as the device ports and accompanying charging logos. And the LED driver 1202b may be used to control illumination of a different set of LEDs 1206b for another identifier, such as the central logo between the device ports.

In example 1250 of FIG. 12B, a single driver 1252 receives input via node 1254. In this example, the LED driver 1252 may be used to control illumination of multiple sets of LEDs 1256a and 1256b. Here, set 1256a may be arranged along one or more parts of the notification region, such as the device ports and accompanying charging logos. And the different set of LEDs 1256b may be arranged for illumination of another identifier, such as the central logo between the device ports. Different sets of LEDs may be individually controlled in terms of brightness.

As noted above, the console may be used to communicate information to passengers in the vehicle. This can include information once a passenger enters the vehicle, such as starting a ride as shown in FIG. 5A. During the trip, the console can present information about the trip status, route, expected arrival time, traffic, weather and the like. Once the vehicle arrives at the destination, the passenger(s) can be alerted as to which side of the vehicle to exit and/or provided with other contextual information about the completion of the trip. While such information may be generated by the onboard control system, such as processing system 202, some or all of the information may be received from a remote system such as a fleet management system or remote assistance service.

Figure 13A:
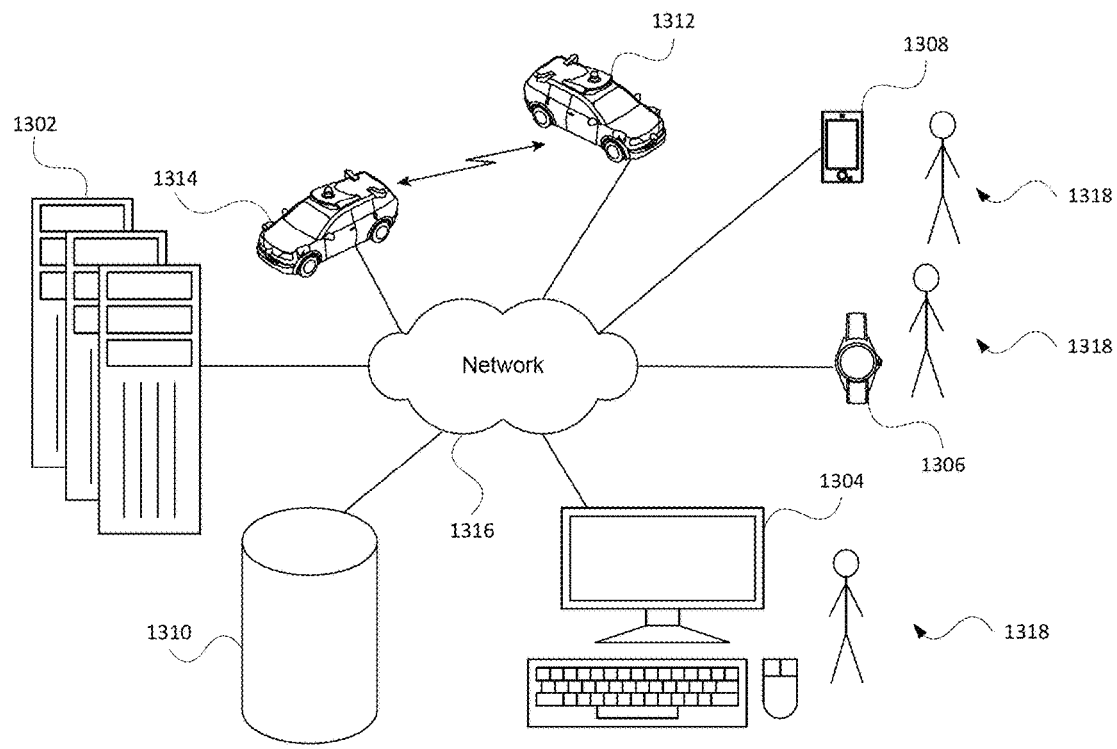
FIGS. 13A-B illustrate example systems for use with consoles in accordance with aspects of the technology.
Figure 13B:
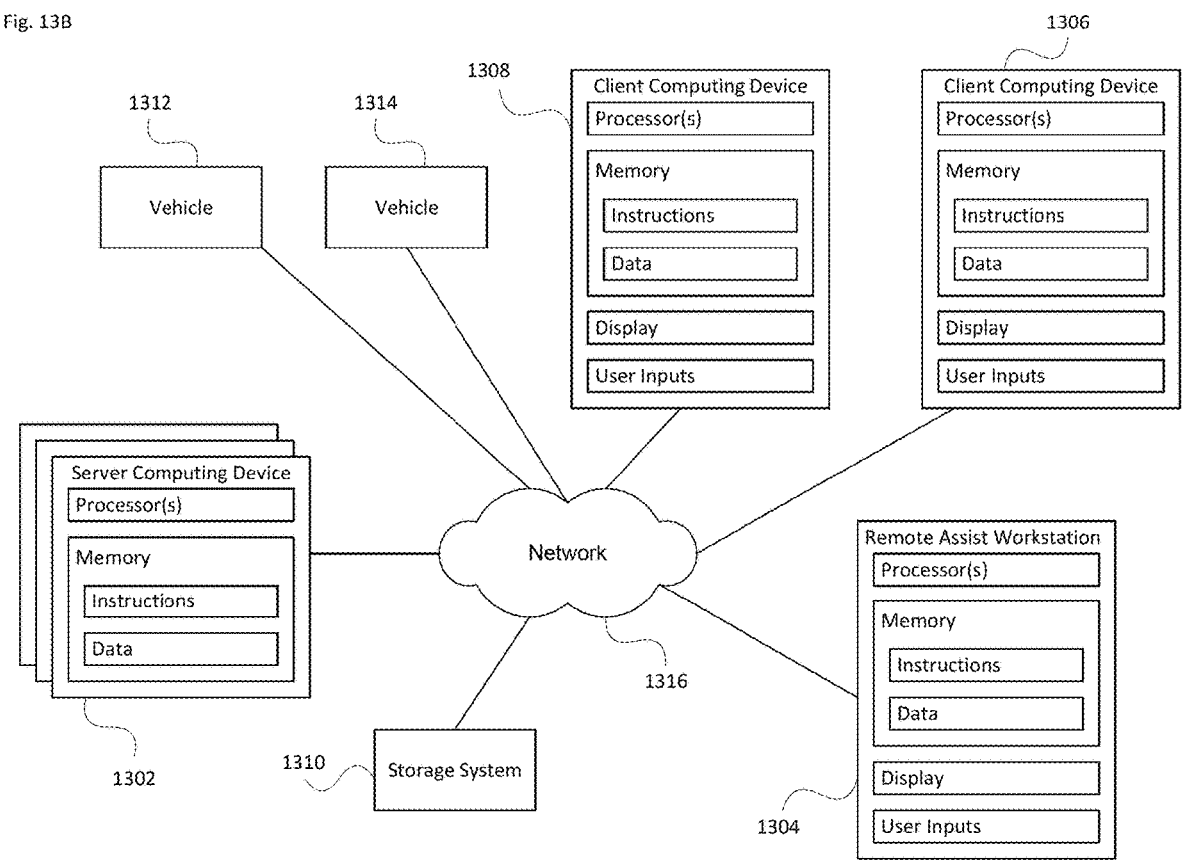

FIGS. 13A-B illustrate general examples of a system for coordinating between passengers and autonomous vehicles, such as self-driving vehicles that are part of a fleet of vehicles capable of providing ridesharing services.

In particular, FIGS. 13A and 13B are pictorial and functional diagrams, respectively, of an example system 1300 that includes a plurality of computing devices 1302, 1304, 1306, 1308 and a storage system 1310 connected via a network 1316. System 1300 also includes vehicles 1312 and 1314, which may be configured the same as or similarly to vehicles 100 and 150 of FIGS. 1A-B, respectively. Vehicles 3112 and 1314 may be part of a fleet of autonomous vehicles, which may or may not operate with a driver assistance. Although only a few vehicles and computing devices are depicted for simplicity, a typical system may include significantly more.

As shown in FIG. 13B, each of computing devices 1302, 1304, 1306 and 1308 may include one or more processors, memory, data and instructions. Such processors, memories, data and instructions may be configured similarly to the ones described above with regard to FIG. 2. The various computing devices and vehicles may communication via one or more networks, such as network 1316. The network 1316, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1302 may function as a ride provider system and include one or more server computing devices having a plurality of computing devices, e.g., a load balanced server farm, that exchange information with different nodes of a network for the purpose of receiving, processing and transmitting the data to and from other computing devices. For instance, computing device 1302 may include one or more server computing devices that are capable of communicating with the computing devices of vehicles 1312 and 1314, as well as computing devices 1304, 1306 and 1308 via the network 1316. For example, vehicles 1312 and 1314 may be a part of a fleet of vehicles that can be dispatched by the ride provider system to various locations. In this regard, the computing device 1302 may function as a dispatching server computing system which can be used to dispatch vehicles to different locations in order to pick up and drop off passengers or to pick up and deliver cargo. In addition, server computing device 1302 may use network 1316 to transmit and present information to a user of one of the other computing devices or a passenger of a vehicle.

As shown in FIGS. 13A-B, each computing device 1304, 1306 and 1308 may be a workstation, server system or personal computing device. By way of example, remote assistance workstation 1304 and client computing device 1308 may each be intended for use by a respective user 1318, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The computing devices 1304, 1306 and/or 1308 may also include a camera for recording video streams, speakers, a network interface device, and all of the components used for connecting these elements to one another. In this example, device 1308 may be the device of a customer who is either currently in a vehicle 1312 or 1314, or may be the device of a customer awaiting pickup.

Although the client computing devices may each comprise a full-sized personal computing device, they may alternatively comprise mobile computing devices capable of wirelessly exchanging data with a server over a network such as the Internet. By way of example only, client computing devices 308 may be mobile phones or devices such as a wireless-enabled PDA, a tablet PC, a wearable computing device (e.g., a smartwatch), or a netbook that is capable of obtaining information via the Internet or other networks.

In some examples, computing device 1304 may be a remote assistance workstation used by an administrator or operator to communicate with passengers of dispatched vehicles (e.g., through an in-vehicle console), or users awaiting pickup. Although only a single remote assistance workstation 1304 is shown in FIGS. 13A-B, any number of such workstations may be included in a given system. Moreover, although workstation 1304 is depicted as a desktop-type computer, the workstation 1304 may include various types of personal computing devices such as laptops, netbooks, tablet computers, etc.

Storage system 1310 can be of any type of computerized storage capable of storing information accessible by the server computing devices 1302, such as a hard-drive, memory card, ROM, RAM, DVD, CD-ROM, flash drive and/or tape drive. In addition, storage system 1310 may include a distributed storage system where data is stored on a plurality of different storage devices which may be physically located at the same or different geographic locations. Storage system 1310 may be connected to the computing devices via the network 1316 as shown in FIGS. 13A-B, and/or may be directly connected to or incorporated into any of the computing devices, such as the ride provider system 1302.

In a situation where there are passengers, the vehicle or remote assistance may communicate directly or indirectly with the passengers' client computing device. Here, for example, information may be provided to the passengers regarding current driving operations, changes to the route in response to the situation, etc. Information may be passed from the vehicle to the passenger or other user via the vehicle's user interface subsystem (e.g., 234 of FIG. 2). For instance, when the user is awaiting pickup, the vehicle may send pickup status information via network 1316. However, when the vehicle arrives at the pickup location or the customer enters the vehicle, the vehicle may communicate directly with the user's device, e.g., via a Bluetooth™ or NFC communication link, or with a passenger using the in-vehicle console.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. An information console for use in a vehicle, the information console comprising:
   a monitor assembly arranged to face one or more riders in the vehicle, wherein the monitor assembly includes a display screen and a notification region adjacent to the display screen, the display screen being configured to provide a first set of information to a rider of the vehicle, the notification region being configured to provide a second set of information to the rider, the notification region including one or more displayable icons, the notification region having:
   a first section comprising a cover layer engaged with a first masking layer, a first diffuser layer and a first illumination layer, the first section of the notification region being configured to selectively illuminate the one or more displayable icons, and
   a second section comprising the cover layer engaged with a second masking layer, a second diffuser layer and a second illumination layer, the second section of the notification region being configured to selectively illuminate one or more components of the information console.

2. The information console of claim 1, wherein the first illumination layer comprises:
   a light guide panel having a first surface facing the first masking layer, and a second surface opposite the first surface; and
   a reflector attached to a surface of the light guide panel.

3. The information console of claim 2, wherein the notification region further includes a light emitting module operatively engaged with the light guide panel of the first illumination layer.

4. The information console of claim 3, wherein the light emitting module includes a set of light emitting diodes distributed along the notification region.

5. The information console of claim 4, wherein the set of light emitting diodes includes a first set clustered in one or more areas of the notification region to selectively illuminate the one or more components, and a second set clustered in one or more areas of the notification region to selectively illuminate the one or more displayable icons.

6. The information console of claim 3, wherein the first masking layer includes one or more portions that are masked to block light emitted from the light guide panel and one or more portions that are unmasked to pass the light emitted from the light guide panel.

7. The information console of claim 2, further comprising a diffusing pattern disposed along a given surface of the light guide panel, the diffusing pattern being configured to diffuse light emitted from a light emitting module.

8. The information console of claim 2, wherein the light guide panel is configured to scatter light emitted from a light emitting module.

9. The information console of claim 2, wherein the second masking layer, the second diffuser layer and the second illumination layer are optically coupled to the light guide panel.

10. A vehicle comprising:
    a control system having one or more processors configured to operate the vehicle in an autonomous driving mode based on objects and conditions in an environment external to the vehicle; and
    a user interface system operatively coupled to the control system, the user interface system including the information console of claim 1, the information console being configured to communicate information about a trip to the rider.

11. The vehicle of claim 10, wherein the first illumination layer comprises:
    a light guide panel having a first surface facing the first masking layer, and a second surface opposite the first surface; and
    a reflector attached to a surface of the light guide panel.

12. The vehicle of claim 11, wherein the notification region further includes a light emitting module operatively engaged with the light guide panel of the first illumination layer.

13. The vehicle of claim 12, wherein the control system of the vehicle is configured to control illuminance of the light emitting module depending on at least one of an amount of ambient light or an ambient temperature.

14. The vehicle of claim 10, wherein the vehicle is a passenger vehicle and the information console includes an endcap affixed to an edge of the monitor assembly, the endcap being secured to a floor of the vehicle between a pair of seats within a cabin of the vehicle.

15. The vehicle of claim 14, wherein the information console further includes an armrest affixed to the monitor assembly.

16. The vehicle of claim 10, wherein the vehicle is a truck and the information console is disposed within a cabin of the truck.

17. The information console of claim 1, wherein the one or more components of the information console include a device port for a communication device of the rider.

18. The information console of claim 17, wherein the one or more displayable icons include a port icon disposed adjacent to the device port, the port icon being configured as a status indicator.

19. The information console of claim 18, wherein the status indicator identifies a battery status of the communication device.

20. The information console of claim 1, wherein the cover layer includes a transparent surface for areas of the notification region encompassing the one or more displayable icons, and a non-transparent surface for areas of the notification region not encompassing the one or more displayable icons.

* * * * *